INVENTOR.
EDWARD KAZMAREK

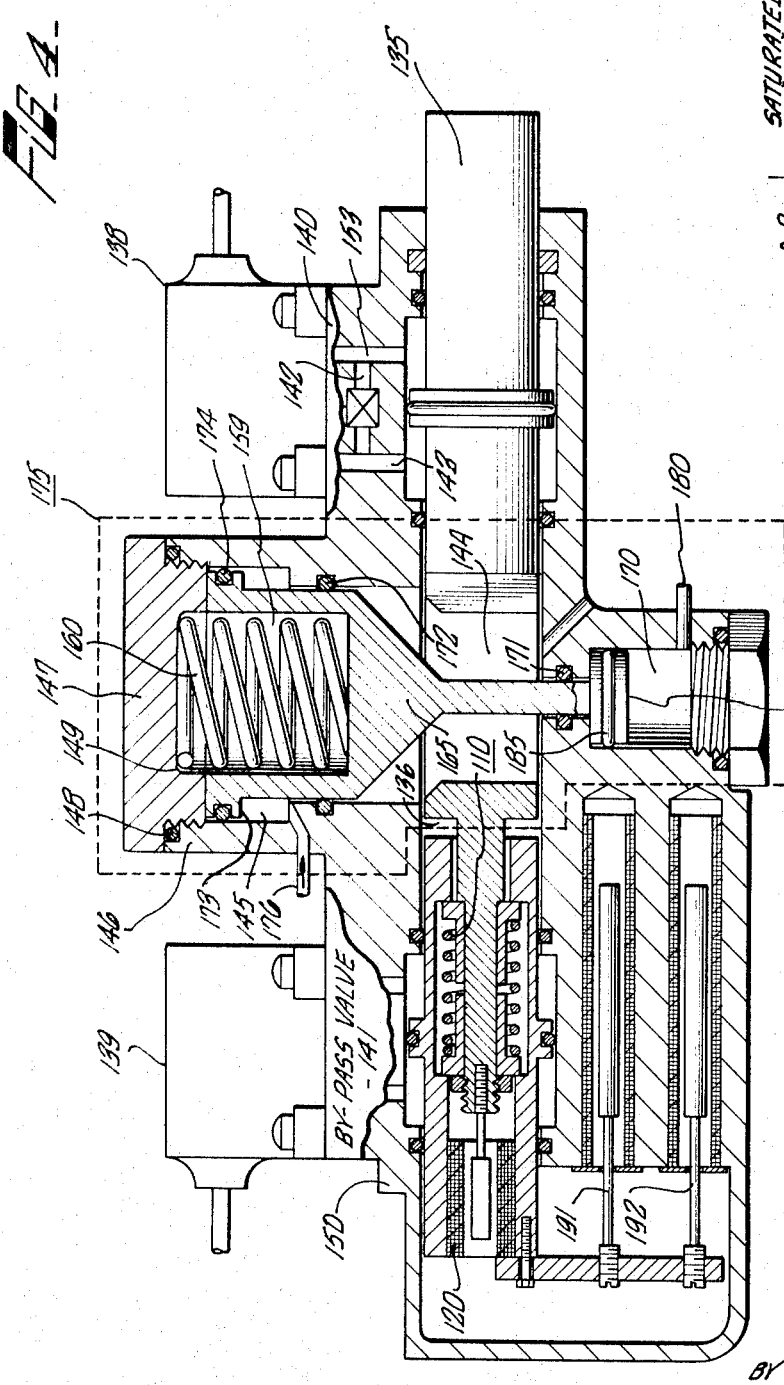

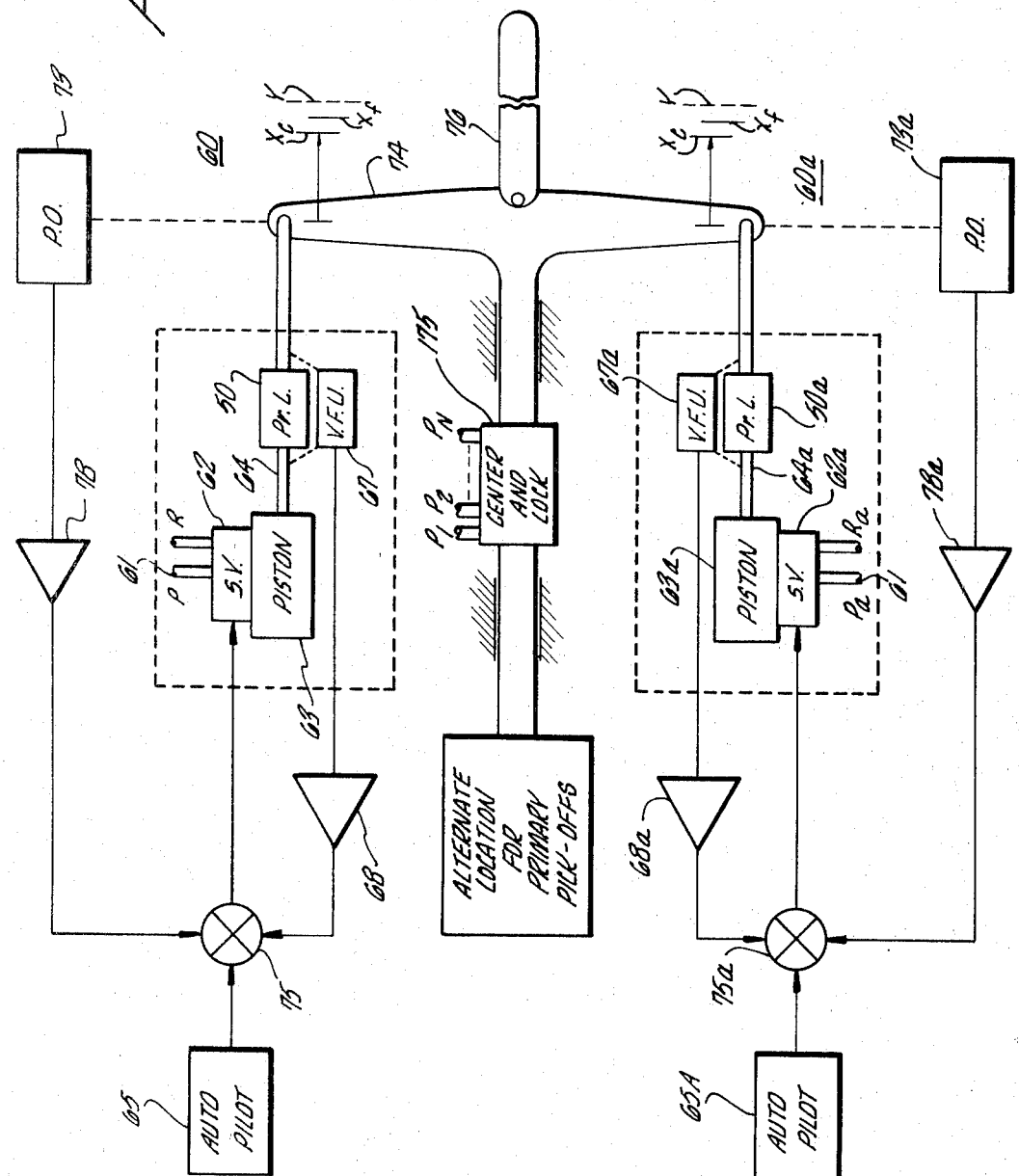

United States Patent Office 3,438,306
Patented Apr. 15, 1969

3,438,306
PRELOADED SERVO ACTUATOR CONTROLS
FOR REDUNDANT SYSTEMS
Edward Kazmarek, Encino, Calif., assignor to Lear
Siegler, Inc., Santa Monica, Calif., a corporation of
Delaware
Filed Feb. 7, 1967, Ser. No. 614,494
Int. Cl. F15b 9/03, 15/26; B64c 13/18
U.S. Cl. 91—171　　　　　　　　　　　　　　　　23 Claims

ABSTRACT OF THE DISCLOSURE

The invention of which certain representative embodiments are herein disclosed relates to servomechanism devices for actuating movement of a member. A new and improved servomechanism system is disclosed which has fail-operational and fail-safe characteristics as provided by a minimum amount of electronic circuitry. A signal emitting generator, such as a transducer, senses the degree of yield in a resilient member which is coupled between a servo actuator's output shaft and a member to be moved. This transducer, in addition to emitting signals capable of utilization in a simplified technique for fail-operational and fail-safe characteristics, also emits signals which modify the command signals for the servo system in a manner which avoids a dead zone normally found in multiple redundant systems when two or more servo actuators provide opposite forces at a common member to be moved.

BACKGROUND OF THE INVENTION

Field of the invention

Servomechanism systems for controlling movement of a member in vehicles such as aircraft, are typical fields of this invention. It has become commonplace to employ two or more systems in an effort to provide a safety factor should one system fail. In vehicles such as an aircraft, these systems are each normally controlled by an automatic pilot, or other commond device, capable of emitting an electrical signal having an appropriate polarity, or phase so as to move the aircraft to a commanded position. The movement of the aircraft itself, in turn, normally nulls out further electrical commands.

Description of the prior art

Such systems normally include a servo valve which receives the electrical signal from the automatic pilot and converts that signal into the required amount of mechanical movement of a member to be moved. A follow-up device is mechanically actuated by movement of the member and is operative for emitting a feedback signal which is proportional to the amount of actual mechanical movement resulting at the member. A high gain is normally included in a minor loop of redundant systems in order to achieve positioning accuracy in the mechanical movements of the member. This high gain presents a dead-zone problem in redundant systems, such as a dual system, in that the output of both actuator devices may be coupled to a rigid member to be moved and may produce opposite direction forces at that member. In such prior art systems unless both servo loops produce concurrently exactly the same amount of mechanical movement at the member for the same signals from an automatic pilot, a dead zone, or opposition of forces, exists. Such dead zones are common because the two servo loops are generally not precisely matched due primarily to a combination of mechanical, electrical, and hydraulic tolerance variations. The high gain signals applied to servo valves in two loops which are not precisely matched may result in one loop fighting the other loop, with the servo valves being pressure, or force, saturated.

This problem in the prior art has been avoided to some degree by hand picking and precisely matching the various electrical components and through expensive precision tooling of mechanical components. This approach, however, is expensive, time-consuming, and does not eliminate inherent tolerance variations in tooling, and unpredicted tolerances resulting from wear, vibration and temperature variations.

Another prior art approach, in order to avoid expensive hand selection of components, is to mix the output by applying them to a mechanical differential. This technique alleviates to a certain extent the inherent tolerance variations in that each loop is reduced in authority. In the event of failure in one of the two minor loops, however, the failed system is either locked in place from any further movement, or springs are utilized to return the failed unit to a neutral position. In either event, however, the remaining operative servo loop, or loops, perform at reduced authority. Thus, at the member to be moved only partial movement at partial velocity is possible. In an endeavor to correct for the lack of response in the unfailed servo loop, attempts have been made to detect a failure and automatically alter signal strength in the unfailed servo system as a means for compensating for failure in one loop. This detection and signal-strengthening approach, although it tends to correct for loss of response, introduces complicated and costly electronics into dual redundant systems. Furthermore, as far as higher multiple redundant systems (i.e. triple etc.) are concerned, this approach poses serious design problems in addition to increased cost for the additional electronics.

SUMMARY OF THE INVENTION

The foregoing disadvantages of the prior art are avoided in accordance with the principles of this invention wherein a multiple redundant signal-responsive system is provided for moving an output member. The system is characterized by a plurality of actuator output shafts connected to move a common member. All of the shafts are intended to move concurrently and simultaneously but each of them exhibit different movements due to gain and other inherent tolerance variations. At least two servo valves are provided, and each valve is adapted to receive an electrical command signal and to move an actuator output shaft in response thereto. Such valves are characterized by linearly variable output pressure at a piston, or output shaft, for input signals less than a predetermined value and are pressure-saturated at a high output pressure for input signals above the predetermined value. A member which is resilient above a pre-loaded value is coupled between the actuator output shafts and the member to be moved. This resilient member, is capable of absorbing relative movement between the member and the output shafts as induced by unbalanced movements from any one or more actuators. Signal emitting means are provided for emitting a signal indicative of the relative movement absorbed by the member, and feedback means apply the emitted signal to the servo valve in such a manner that it is controllably operative within its linear output pressure range, i.e., operative at less than its pressure-saturated operating level.

DESCRIPTION OF DRAWINGS

The foregoing and other features and principles of this invention may more readily be understood by reference to accompanying drawings in which:

FIGURE 1A is a representative curve showing operational characteristics of a typical servo valve;

FIGURE 2 is a combined schematic and block diagram of an improved dual actuator system of this invention;

FIGURE 3 is a partially cut-way side elevation of an alternative actuator of this invention;

DESCRIPTION OF SPECIFIC EMBODIMENTS

Figures 1, 2A:
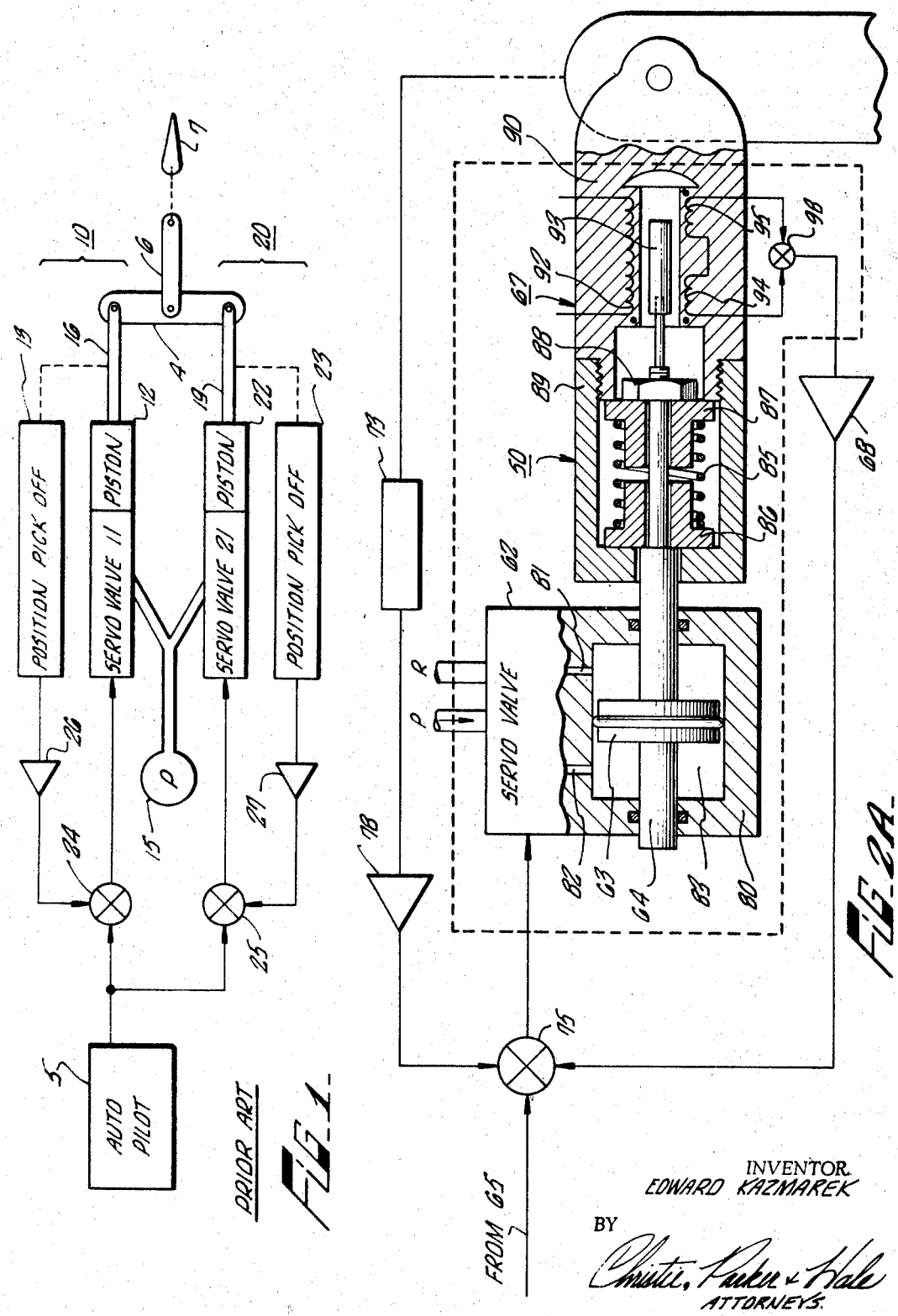
FIGURE 1 is a dual redundant actuator system of the prior art.
FIGURE 2A is a partially cut-away side elevation of one actuator of this invention suitable for employment in the embodiment of FIGURE 2.

A dual actuator system typifying known prior art systems, is depicted in FIGURE 1. Such a prior art system includes two channels 10 and 20 which channels receive command signals from a command circuit such as an autopilot circuit 5 and in response to the command signals more a rigid member 4. Member 4 may, in turn, move a control link 6 which is mechanically coupled to a steering surface 7 of an aircraft. The term "rigid member" denotes a body that itself has no ability to take up any differences in movement of the actuators connected to it. This is to be distinguished from a conventional differential link such as a center pivoted link driven at its ends by actuators, which does have this ability.

In the system of FIGURE 1, a hydraulic pressure source 15 supplies hydraulic fluid under pressure through a servo valve and piston combination which is provided for each channel. As is well known, a command signal applied to a servo valve, such as servo valve 11 of channel 10 opens a port in the valve, thus allowing hydraulic fluid from source 15 to drive piston 12. Piston 12 includes a piston shaft 16 which is connected to one end of member 4. In a similar manner, in the lower channel 20, a second servo valve 21 opens in response to a command signal and allows hydraulic fluid under pressure from source 15 to drive piston 22. Piston shaft 19 is connected to the other ends of member 4.

A pair of position pickoff devices 13 and 23 are provided, one for each channel. These pickoff devices 13 and 23 sense the movement of the piston shafts 16 and 19 and feed back signals through amplifiers 26 and 27 to a pair of summing junctions 24 and 25, where the feedback signals are combined with the command signal from autopilot circuit 5.

A common and heretofore unsolved problem of prior art systems such as that of FIGURE 1, is that such systems tend to work against each other unless both the upper and lower channels 10 and 20 are equally matched. To appreciate this problem, assume that both channels 10 and 20 receive the same command signal from autopilot 5 at summing junctions 24 and 25. Assume further that channel 10 because of various unpredictable and uncontrollable factors such as mechanical and electrical tolerances assumes its commanded position sooner than channel 20. Once upper channel 10 reaches its commanded position and position pickoff 13 nulls out the command signal at summing junction 24, there should be no further movement required or expected in channel 10. At this same time, however, channel 20 has not completed its commanded movement, and piston 22 continues to drive the rigid member 4. Member 4, being rigidly connected to piston shaft 16, pulls shaft 16 away from its null position and position pickoff 13 applies a signal to summing junction 24 which exceeds the command signal, and being opposite in polarity, drives piston 12 in a reverse direction. Thus, piston 12 and piston 22 are opposing each other through opposite direction forces on the common and rigid link 4. In instances where high gains are provided through amplifiers 26 and 27, the valve-piston combinations 11, 12 and 21, 22 are normally in the saturated pressure portions 31, 32 of curve 33 of FIGURE 1A. Such saturated channel-to-channel opposition at link 4 constitutes a dead-zone wherein further command is not possible in an accurate and reliable manner required by today's high accuracy servo systems.

In accordance with my invention, the foregoing disadvantages of the prior art system of FIGURE 1 are avoided. In my invention the individual channels automatically compensate for any mechanical, electrical or hydraulic variations within the channel so that the servo valve-piston unit operates without any dead zone.

One representative embodiment of the invention, which is depicted in FIGURE 2, includes a preloaded resilient member between the piston shaft in each channel and the rigid member which is common to all channels. If N equals the number of channels, then resilient members are provided in at least $N-1$ channels. Associated with each resilient member is a vernier follow-up device that senses relative displacement between the piston shaft and the driven member. This vernier follow-up emits signals which are fed back to its own channel's summing junction so as to maintain minor loop equilibrium for all channels, regardless of whether or not each channel originally responds with the same or with different movement amounts and/or speed.

Upper and lower channels 60 and 60a, which are representative of a dual actuator system, are depicted. Both channels are identical and so the same numbers are used to describe like components in each channel, the suffix a being used for the components of one channel. A hydraulic fluid connection 61 for servo valve 62 is depicted but it should be understood that the invention applies equally as well to electro-mechanical, electro-magnetic, and pneumatic actuators to list some common servo approaches. Furthermore, if a hydro-mechanical or pneumatic approach is selected, then one or more sources of pressure may be employed without limiting the invention.

Fluid pressure applied via connection 61 to servo valve 62, is transferred to piston 63 by servo valve 62 in accordance with command signals applied from autopilot 65. A preloaded member 50 such as a spring or other compliance member resiliently couples shaft 64 to a rigid member 74. Member 74 is mechanically coupled through a center-mounted member 76 so as to position any desired load such as a steering assembly. The resilient member 50 is pre-loaded with an amount greater than the opposing force required at the load, and less than the saturated pressure force (31, 32 of FIGURE 1A) for the servo valve-piston combination 62, 63.

As one typical nonlimiting example, this pre-loaded force may be in the area of 75 to 100 lbs., as compared with approximately 750 to 1,000 lbs. of output force for the valve-piston unit 62, 63.

As will be described hereinafter, the pre-loaded forces of resilient members 66 and 66a need not be equal in those instances wherein a master and slave channel operation is desired. Also, as will be described hereinafter, only one resilient member is required in a dual redundant system.

Associated with the pre-loaded resilient member 50 is a vernier follow-up 67. Follow-up 67 senses relative movement in either direction between the piston shaft 64 and member 74. Output signals emitted by vernier follow-up 67 are proportional (in magnitude and polarity and/or phase) to this relative movement, and are applied to the summing junction 75 by a feedback path including an amplifier 68. The addition of this vernier follow-up 67 and its associated feedback path to junction 75 allows complete control of member 74 without any dead zone being present.

In order to understand fully the reason for this new and improved operation, assume that autopilots 65 and 65a each emit a command signal of say 10 milliamperes to summing junctions 75 and 75a. Such a command signal is intended to move member 74 to the position marked $X_c$. Due to tolerance and temperature variations, it is common for one channel, for example channel 60, to reach its null point $X_c$, while another channel such as 60a is still seeking to reach its null point such as $X_c$. At point $X_c$ for channel 60 a feedback signal of substantially 10 milliamperes of opposite polarity to the command signal will substantially null out any further output from summing junction 75. Prior to this null both the resilient members have been translating with piston shafts 64, 64a and member 74 without any yield in either elongation or retraction. Such non-yielding movement of member 50 and 50a does not emit any output signals from vernier follow-ups 67 and 67a.

Unpredictable variations between channel 60 and 60a result in channel 60a trying to move beyond position $X_c$ to a position Y which is necessary for channel 60a to attain before its summing junction 75a is to be nulled out. Thus, when channel 60a approaches position $X_c$ its feedback signal from position pickoff 73a may only be in order of minus 8 milliamperes, thus leaving plus 2 milliamperes driving current present at the lower channel servo valve 62a. Such an input would represent a saturated operating condition for valve 62a as indicated, for example, by point 35 on curve 33 of FIGURE 1A. The dead-zone problem of the prior art is clearly pointed out by noting that if channel 60a continued driving toward position Y then the upper channel would recognize this movement beyond its own null position of $X_c$ and an opposite polarity signal would be applied to servo valve 62 in an attempt to move rigid link 74 away from position Y and toward position $X_c$. Both channels 60 and 60a in such a condition would be fully saturated at opposite positions as depicted by points 36 and 37 on curve 33 of FIGURE 1A.

The vernier follow-up devices 67 and 67a provide a means for avoiding the dead-zone just described in that they modify the input signals from the primary pickoffs 73 and 73a such that servo valves 62 and 62a are always operating during the terminal portions of a commanded movement, in the substantially linearly variable pressure control range of FIGURE 1A. This signal modification results in standing error signals of small value and opposite polarity for channels 60 and 60a.

In order to appreciate the operation of these vernier follow-up devices, assume that channel 60a continues to drive member 74 beyond position $X_c$ to $X_f$. At position $X_f$ the primary pickoff 73a is emitting say minus 8.5 milliamperes, leaving a net driving signal to valve 62a of plus 1.5 milliamperes. At the same $X_f$ point primary pickoff 73 of channel 60 is emitting a signal of minus 10.5 milliamperes or a net driving signal of minus .5 milliampere for servo valve 62. In opposition to that of servo valve 62a, the unbalanced condition between channels 60 and 60a introduces elongation in resilient member 50 and retraction in resilient member 50a. This yield in both members is sensed by vernier follow-ups 67 and 67a and modifying signals are fed back to summing junctions 75 and 75a by amplifiers 67 and 67a. Each signal may be for example, 1.25 milliamps at position $X_f$ for rigid member 74. Since the relative movement in both members 50 and 50a is opposite, the output signals from vernier follow-ups 67 and 67a, likewise, are of opposite polarity. The upper channel vernier signal is plus 1.25 milliamperes, and the lower channel vernier signal is minus 1.25 milliamperes. With these modifying vernier signals present a net driving signal of plus .25 milliampere is present at valve 62 and a minus .25 driving signal is present at valve 62a. These signals correspond to points 38 and 39 on the curve 33 of FIGURE 1A and thus are within a readily controllable non-saturated point on the servo valve operating curve.

The operation of the servo system in the pressure control range (FIGURE 1A) allows minor modification in position of a common member from channel-to-channel which minor modification is automatically compensated for by balanced variations in the standing error signals applied to the servo valves in each channel. Furthermore, the autopilot, or other command device, may apply small correction signals which are sufficient to overcome the standing error signals and thus command small movements in the member to be moved. Such precision has been totally lacking in prior art systems having saturated servo valves operating with a dead zone as far as command is concerned.

The foregoing operation may more readily be understood in conjunction with the details of FIGURE 2A taken together with the system description of FIGURE 2. In FIGURE 2A piston shaft 64, driven by piston 63, is capable of linear movement in either direction within cylinder housing 80. Piston 63 moves either to the right or to the left depending upon the polarity of the signal applied to the servo valve 62 which valve in normal servo valve operation opens one or the other of ports 81, 82 shown schematically. For simplicity purposes, certain return ports and vents as known to the art are omitted in FIGURE 2A. In the example of FIGURE 2A the resilient preloaded member 50 includes a compressed spring 85, two spring keepers 86 and 87, and a keeper nut 88. Member 50 is housed in a casing 89. Casing 89 is threadably coupled to another casing 90 which houses one typical vernier follow-up unit 67.

Follow-up 67, commonly referred to as a differential transformer, comprises an excitation winding 92 which is inductively coupled through a movable core 93 to a pair of series opposed windings 94 and 95. Core 93 is normally centered at preload so as to allow equal and opposite inductive coupling from excitation winding 92 to windings 94 and 95. Such coupling results in a zero output voltage for the normal preloaded condition on spring 85. Any movement of core 93 away from its normal position, however, will provide either a positive or a negative signal to amplifier 68 depending upon the direction of movement.

Normal driving motion of piston 64 moves casings 89, 90 without any yield in spring 85, as long as balanced conditions exist between channels 60 and 60a (FIGURE 2). If channels 60a continues to drive beyond position $X_c$ for channel 60, then rigid member 74 pulls casing 89, relative to the nulled position for piston 63. Thus spring 85 is compressed and core 93 is displaced from its normally centered position. Displacement of core 93 alters the amount of inductive coupling between excitation winding 92 and windings 94 and 95, and results in an output signal being emitted from summing junction 98. It should be noted that in either instance, the unbalanced channel, i.e., the one driving after equilibrium is present in the other, also tends to correct its own unbalanced condition with the preloaded member 50 and vernier follow-up 67 of the invention. With springs 85 (channel 60) and 85a (channel 60a) each being elongated and retracted, any movement in either channel over and above a supposedly "nulled-out" movement for one channel allows a balanced system operation. Core 93 in channel 60 and core 93a of channel 60a (assuming two are used, although it is not necessary) thus are displaced in opposite directions. The output error signal from the vernier follow-up in the unbalanced channel tends to counteract that unbalanced condition, while the output error signal from the vernier follow-up in the balanced channel tends to compensate for the system unbalance resulting from the unbalanced channel.

FIGURE 3 shows an embodiment of my invention employing a more compact arrangement than that of FIGURE 2A. It may be used alone, or in a dual system with a standard prior art actuator, or it may be used in triple and higher multiple redundant systems. In FIGURE 3, an oversized piston housing 103 is mounted within piston chamber 104 for linear movement under control of servo valve 105 and ports 106 and 107, in a manner similar to that described hereinbefore in connection with piston 63 of FIGURES 2 and 2A. A resilient member, such as spring and keeper assembly 110 is housed within a stepped bore opening 112 passing through the length of piston 103. Spring assembly 110 is secured to one end of the piston output shaft 100 by nut 102. Shaft 100 is slidably secured within bore 112 by a loose fitting collar insert 115, which is threadably inserted into the right-hand end of piston housing 103.

Shaft 100, under normal and balanced operating conditions, drives a common member such as member 74, FIGURE 2. In an unbalanced condition, spring assembly 110 allows relative movement between shaft 100 and piston 103. A vernier follow-up device 120 which operates in the same manner as the follow-up 67 of FIGURE 2A, is provided at the left-hand end of piston 103. This follow-up device 120 senses relative movement between the piston shaft 100 and the main piston body 103. Thus, in the actuator of FIGURE 3, a more compact arrangement results which embodies the same general principles of the invention described hereinbefore.

Figure 4:
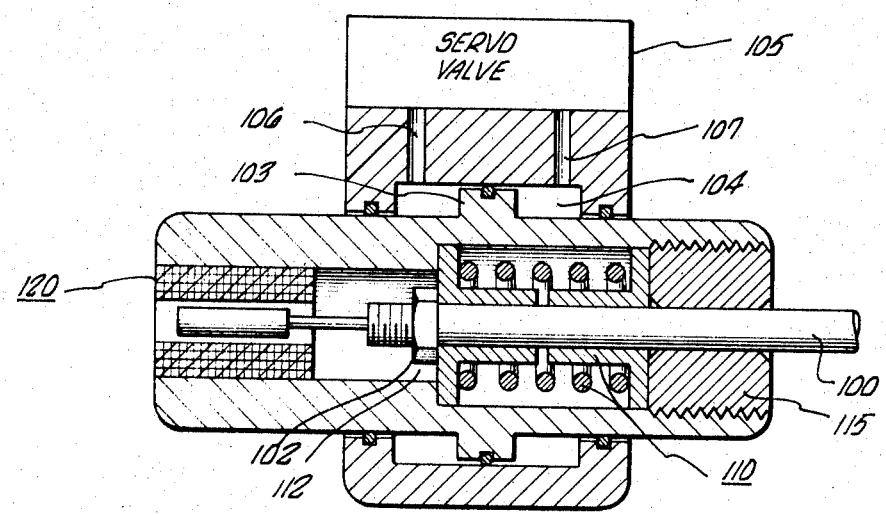
FIGURE 4 is a partially cut-away side elevation of a dual-tandem servo actuator of this invention.

The arrangement of FIGURE 4 includes, at least one piston-valve combination similar to that of FIGURE 3 although it may include several such combinations if desirable. The arrangement depicted in FIGURE 4 is a dual system comprising two valve-driven pistons in tandem on a single member-moving shaft 135. Of course, a triple redundant operation could be provided by the addition of another valve-piston combination. For clarity, only certain portions of the dual tandem arrangement of FIGURE 4 are shown broken away in side elevation.

Shaft 135 is driven by a right-hand servo valve 138 and a left-hand servo valve 139. Shaft 135 includes at its middle section a flat tapered centering slot 144. Extending upwardly from centering slot 144 and communicating with the piston chamber 136 for shaft 135 is a centering and locking unit 175 shown within dashed lines. Unit 175 includes a step-bored chamber 145 formed in an upwardly extending collar 146 of the main housing 150. Collar 146 threadably receives a cap 147 and a sealable O ring 148. Cap 147 has a spring housing recess 149 in its underside for receiving one end of a compression spring 160. The other end of spring 160 is seated within a centrally located spring housing bore 159 in detent bar 165. Detent bar 165 is Y shaped with the lower part of the Y passing through the centering slot 144 and entering into a second centering chamber 170 located beneath the centering slot 144. O ring collars 171 and 172 are located at opposed ends of detent bar 165 to provide sealed slidable movement for bar 165 within chambers 145 and 170. Ports 176 and 180 bring pressure from any suitable source into chamber 145 and 170 respectively. Pressure from port 176 fills chamber 145 and forces against the bottom face 173 of a piston collar 174 on detent bar 165. In a similar manner pressure from port 180 fills chamber 170 and forces against the bottom face 184 of a piston collar 185 on the lower end of detent bar 165. The pressure from either port 176 or 180 is selected so that it has sufficient force on either bottom face 173 and/or bottom face 184 to overcome the compression force of spring 160. Thus, under normal servo operation, and until pressure from both ports 176, 180 is removed, the detent bar 165 is held against cap 147 in the position shown.

The lower portion of the Y shape for detent bar 165 is flat and less in width than the width of the flat centering slot 144 (dimension into the paper) so as to allow slidable movement of shaft 135 either to the right or left depending upon the driving operation of servo valves 138 and 139. The operation of these servo valves is as described hereinbefore except that pressure operation by-pass valves 140 and 141 are associated with each servo valve. These by-pass valves 140 and 141 are well known and need not be described in detail other than to state that as long as pressure is present at an associated servo valve such as 138, then a shunt port 142 communicating between the servo valve ports 143 and 153 is normally closed as schematically indicated by the X in the shunt port 142. When pressure is removed from valve 138, such as in the case of a failure, then by-pass valve 140 opens shunt port 142 allowing any fluid remaining to freely circulate without impeding any movement of shaft 135 as controlled by the remaining servo valve 139.

FIGURE 4 illustrates a dual tandem system with two primary pickoff devices 191 and 192 which may also advantageously be differential transformers. The full advantages of the invention may be obtained by employing only one vernier follow-up. The left-hand side of FIGURE 4 is basicly the same as the arrangement of FIGURE 3 and its structure and operation need not be repeated here. Primary pickoffs 191 and 192 correspond to pickoffs 173 and 173a of FIGURE 2, and one only vernier follow-up 120 (FIGURE 4) corresponds to either one of the vernier follow-ups 67 or 67a (FIGURE 2). The system operation is that previously described for FIGURE 2 except that the spring assembly 110 of FIGURE 4 must exhibit slightly more yield (i.e., elongation and/or retraction) to provide a position balance in both valves 138 and 139 of FIGURE 4.

The principles of my invention as related to fail-operational and fail-safe systems, are applicable to parallel or series oriented system operations, and this is true for dual, triple, or other multiple redundant systems. These principles are discussed hereinafter by reference to one preferred nonlimiting embodiment of FIGURE 5.

As is well known, a failure either in electronics or in the hydraulic system for one channel normally results in a so-called "hard-over" in that a piston and its shaft are driven to one extreme position. In redundant systems such a movement in one channel generates a large error signal in the remaining channels with the result being an attempt in such other channels to go hard-over in the opposite, to therefor compensate for the failure. Such a condition, of course, creates total loss of control as all valves are saturated unless the failed channel is removed from the actuator system.

Prior art removals of the failed channel have included centering devices which return and/or lock the failed channel in its center position. Normally associated with such centering devices are complex comparator circuits and switching devices to assure that the gain of the remaining channel is increased to compensate for loss of authority (movement and velocity) caused by the failed channel. In the redundant system of this invention such complex electronics are not necessary. Furthermore, the fail-operational capability of this invention allows complete authority without requiring gain changes in any operational channel's amplifier system.

Figure 5:
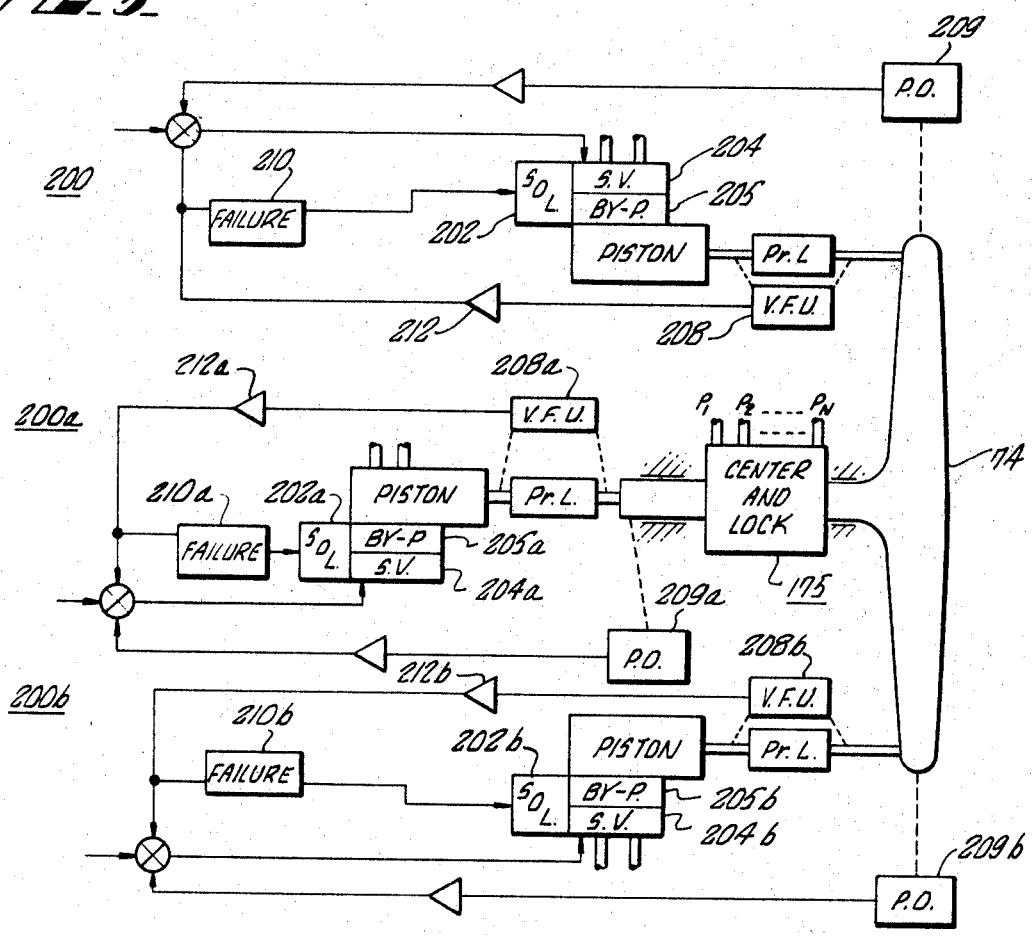
FIGURE 5 is a combined schematic and block diagram of a triple redundant system useful in demonstrating the fail-operational and fail-safe features of this invention.

The system of FIGURE 5 includes three channels 200, 200a and 200b, each of which comprise the same components that bear the same reference numerals, the reference numerals of channels 200a and 200b having subscripts a and b. The three channels operate in the manner previously described with the exception that a solenoid device 202 has been added to each channel. This solenoid valve 202 may be any well-known type valve which is signal responsive and which operates to remove the actuating power whether electrical, pneumatic, or hydraulic from the servo and bypass valves 204, 205. Solenoid 202 is operated by a failure indication signal which is automatically emitted by failure detection circuit 210 should channel 200 fail. Failed etection circuits 210, 210a and 210b each comprise a threshold detector circuit of any well-known type. Such circuits emit an output signal only when the input signal exceeds some predetermined signal value. Input signals for failure detection circuits 210, 210a and 210b are derived from vernier follow-ups 208, 208a and 208b, respectively. The operating range for vernier follow-ups, such as 208, will vary from system to system and depending upon the type of vernier that is employed. In one instance, a normal operating range for a vernier follow-up such as 208 may be between approximately 0 and .75 milliampere (assuming unity gain for amplifier 212). This range provides ample signal output for normal channel-to-channel variations. Thus, in normal operation with all channels driving in a substantially balanced condition, any one of the three vernier follow-ups 208, 208a and 208b would emit no more than .75 milliampere. This upper predetermined limit is the threshold level for failure detection circuits 210, 210a and 210b respectively. Thus, any output from the vernier follow-up 208 in excess of the threshold level for failure detector 210 results in an output signal being applied by detector 210 to solenoid 202.

It is commonplace in a failure of a channel for the servo valve to drive the piston to one extreme position or the other. If it is assumed that the servo valve 204 upon failure, has driven its associated piston to the extreme right, this extreme movement will be far in excess of the balancing command normally issued from vernier follow-up 208 and amplifier 212.

Channels 200a and 200b are proceding in their normal driving operation and each will oppose the movement which has been introduced by a failure in channel 200. The opposition to this movement is thus divided between both channels and results in some retraction in the preloaded members. Because the failure is absorbed in both channels 200a and 200b, vernier follow-ups 208a and 208b stay within their normal operating range. Accordingly, failure detectors 210a and 210b do not receive any signal in excess of their threshold level and channels 200a and 200b remain active.

The signal emitted by vernier 208 in channel 200, however, exceeds the threshold level in failure detection circuit 210, and it responds by energizing solenoid 202. Solenoid 202 in turn removes the input pressure to servo valve 204 and at the same time energizes the bypass valve 205. Bypass valve 205, as described hereinbefore in connection with the description of FIGURE 4, allows freedom of movement of its associated piston.

The operation as just described has been referred to herein as fail-operational in that a failure in one channel such as 200 does not in any way detract from the effectiveness of the actuator system. For example, channels 200a and 200b continue operating as a dual redundant system and do so without any loss of authority because the combined solenoid and bypass operation allows complete freedom of movement of the piston and actuator output shaft for channel 200. There is thus no requirement that a complicated gain varying detection be used as was the case in prior art systems. Each of the remaining channels 200a and 200b includes the same failure detection operation and their operation upon a failure need not be repeated here. Suffice it so say that either one of the two remaining channels may fail and the system is nevertheless fail-operational.

Fastened to the common member 74 (FIGURES 2 and 5) is a center and lock device 175 which may be substantially the same as the center and lock device 175 described hereinbefore in connection with the description of FIGURE 4 except that member 74 replaces the right-hand piston of FIGURE 4. A number of input ports, one for each channel, are shown connected to the center and lock device 175. The solenoid in each failed channel, upon its energization, removes pressure from the center and lock device 175. As described in connection with the description of FIGURE 4 it is necessary that pressure be removed from all pressure inputs before the center and locking action occurs. Thus in conjunction with the multiple redundant system of FIGURE 5, only after all channels have failed would the pressure be entirely removed from the center and lock device 175 at which time the common output member 74 would be centered and located in position so that a human pilot could replace the autopilot.

Numerous combinations for the invention have been described in this specification without intent to limit the principles of the invention. For example any one or more channels, such as 200a, FIGURE 5, could be an electromechanical actuator or even a well-known servo simulation channel for failure monitor purposes. Alternate locations for the primary pickoffs are shown in FIGURE 2 and FIGURE 4. Numerous other modifications will become apparent to those skilled in the art without departing from the spirit and scope of my invention.

What is claimed is:
1. A multiple redundant system characterized by N actuator channels all of which are adaptable for connection in common to a member which is to be moved, and all of which are intended to exhibit concurrent and simultaneous movements in response to command signals, but each of which exhibit different movements resulting from channel-to-channel variations, said multiple redundant system comprising:
   N servo valves, one for each channel and each being characterized by a linearly variable output pressure zone for command signals below a predetermined signal value and further being characterized by a saturated output pressure zone for command signals above said predetermined signal value;
   an actuator output shaft for each valve capable of linear movement in response to the output pressure of said valve;
   resilient means in at least N–1 channels for coupling the actuator output shafts of the channels to the member to be moved, said means being capable of yield relative to the member and its associated output shaft only in response to differing channel-to-channel movements; and
   means sensing yield in at least one of said resilient means for emitting an electrical feedback signal in response thereto such that when mixed with a command signal for the valve associated with the resilient means produces a resultant signal less than said predetermined command signal value.

2. A multiple redundant system in accordance with claim 1 wherein said resilient means comprises:
   a compression spring preloaded to an amount less than the saturated output pressure of its associated valve and greater than the pressure required to move the member, and being capable of either elongation or retraction for differential pressure between the output shaft and the member in excess of said preloaded amount.

3. A multiple redundant system in accordance with claim 2 wherein said yield sensing means comprises:
   a vernier follow-up device coupled for relative movement between the actuator output shaft and the member to be moved, and responsive to elongation or retraction in said spring for emitting feedback signals of opposite phase or polarity for such elongations and retractions.

4. A multiple redundant system in acordance with claim 1 and further characterized as including a source of command signals for the actuator channels, said system further comprising in each channel:
   a summing junction for receiving a command signal for that channel; and
   connecting means between the summing junction and the servo valve for applying the output from the summing junction to the servo valve.

5. A multiple redundant system in accordance with claim 4 and further comprising for each channel:
   a primary pickoff means for sensing movement of the member induced by the channel and for emitting a feedback signal to null out the command signal for the channel; and
   means for applying the primary pickoff feedback signal to the summing junction for the channel inducing the sensed movement of the member.

6. A multiple redundant system in accordance with claim 5 wherein the number of channels is at least two and further comprising:
   feedback connection means for applying the feedback signal from said yield sensing means to the summing junction for the channel provided with the resilient means.

7. A multiple redundant system in accordance with claim 6 wherein said resilient means in one of said two channels comprises:
a compression spring preloaded to an amount less than the saturated output pressure of its associated valve and greater than the pressure required to move the member, and being capable of either elongation or retraction for differential pressure between the output shaft and the member in excess of said preloaded amount; and
wherein said yield sensing means comprises:
a vernier follow-up device mechanically coupled between the actuator output shaft and the member to be moved and responsive to elongation or retraction in said spring for emitting feedback signals of opposite phase or polarity for the elongations and retractions.

8. A multiple redundant system in accordance with claim 1 wherein said yield sensing means emits feedback signals within a predetermined signal range when at least two channels are operative, and emits signals in excess of said range in response to an operating failure in either of said at least two channels, said system further comprising:
a failure detection sircuit including a threshold level for said operative feedback signal range and means for emitting a failure indication signal for feedback signals in excess of said threshold level;
means connecting said failure detection circuit to said yield-sensing feedback signal emitting means; and
signal interrupting means connected to said failure detection means and operative in response to a failure indication therefrom for interrupting the application of command signals to at least one servo valve in said at least two channels.

9. A multiple redundant system in accordance with claim 8 wherein N is equal to two, and wherein said signal interrupting means interrupts the application of command signals to the servo valves in both channels; said system further comprising:
a locking device associated with said member and responsive to interruption in both channels for locking the member from any further movement.

10. A servo mechanism to be employed with a signal emitting command circuit for moving a member, comprising:
a signal responsive servo valve for driving an output shaft at a controllably variable output pressure for command signals of less magnitude than a predetermined threshold command signal level, and for driving the output shaft at a saturated and higher output pressure for signals having an amplitude in excess of said predetermined threshold command signal level;
a drivable output actuator shaft associated with said valve and adaptable for connection to a member to be moved;
means preloading the actuator shaft relative to the member and yieldable for pressure differentials between the shaft and the member in excess of the preloaded amount, said preloading means comprising a spring compressed the preloaded amount and coupled between the piston and the actuator output shaft; and
means responsive to yield in said preloading means for emitting an electrical modifying signal such that when mixed with a command signal produces a resultant signal less than said predetermined threshold command signal level for said servo valve, said yield responsive means comprising a vernier follow-up adapted for translatory movement with said piston, spring, and output shaft when the spring is in a non-yielding condition and adapted for relative movement between the piston and the output shaft when the spring is yieldingly moved in either elongation or retraction.

11. A servo mechanism in accordance with claim 10 wherein said vernier follow-up further comprises:
a signal emitting means normally non-responsive to said translatory movements, and responsive to elongation or retraction in said spring for emitting feedback signals of opposed phase or opposed polarity for elongations and retractions.

12. A servo mechanism to be employed with a signal emitting command circuit for moving a member, comprising:
a signal responsive servo valve for driving an output shaft at a controllably variable output pressure for command signals of less magnitude than a predetermined threshold command signal level, and for driving the output having an amplitude in excess of said predetermined threshold command signal level, said servo valve including a piston housing and a piston slidably mounted therein for linear movement in either direction in response to opposed polarity or opposed phase command signals applied to said valve;
a drivable output actuator shaft associated with said valve and adaptable for connection to a member to be moved;
means preloading the actuator shaft relative to the member and yieldable for pressure differentials between the shaft and the member in excess of the preloaded amount, said preloading means comprising a spring compressed the preloaded amount and coupled between the piston and the actuator output shaft, said spring being preloaded to an amount less than the saturated output pressure of the valve and greater than the pressure required to move the member and being yieldingly movable in either elongation or retraction in response to differential pressure in excess of said preloaded amount between the actuator output shaft and the member;
means responsive to yield in said preloading means for emitting an electrical modifying signal such that when mixed with a command signal produces a resultant signal less than said predetermined threshold command signal level for said servo valve; and
at least one primary position pickoff means mounted to sense relative movement between the piston housing and the actuator output shaft and to emit an output signal in response thereto.

13. A servo mechanism in accordance with claim 12 wherein:
the signals emitted by the primary pickoff means are of a polarity and/or phase to oppose signals emitted by the command circuit, and wherein said servo mechanism further comprises;
a summing junction for summing signals emitted from said signal command circuit, said primary pickoff means and said yield-response means for applying the resultant signal from said summing junction to said servo valve.

14. A multiple redundant command signal-responsive system for moving a member, said system being characterized by a plurality of actuator channels all of which are intended to move the member concurrently and simultaneously but each of which exhibit different movements due to channel-to-channel variations, said system comprising:
at least a first and a second channel each having a movable output shaft adaptable for connection in common to a member to be moved, and each channel further comprising a servo valve for moving that channel's output shaft in response to an electrical command signal;
first signal-emitting means responsive to movement of the member to a null position for the first channel for emitting a signal to cancel out any further commanded movement of the member by the first channel;

first feedback means for applying said emitted signal from said first signal emitting means to the servo valve of said first channel;

a first compliant member coupled between the member to be moved and the output shaft of the first channel's servo valve and translatory with movements of the first channel's output shaft when the member to be moved receives balanced movement from both said first and second channels, said compliant member being capable of yield relative to the first channel's output shaft when said member to be moved is moved by said second channel away from the null position for the first channel;

second signal-emitting means for emitting a signal indicative of said relative yield in said compliant member; and second feedback means applying said second signal to said first channel's servo valve for commanding movement of said first channel's output away from the first channel's null position until equilibrium of said first and second channel is obtained.

15. A multiple redundant system in accordance with claim 14 and further comprising:

a first compliant member for each channel, and all compliant members being preloaded and mechanically coupled between the member to be moved and the output shaft for each channel.

16. A multiple redundant system in accordance with claim 15 wherein all of said compliant members comprise:

A compressed spring preload with a pressure selected from a range less than the least pressure output for any valve and greater than the pressure required to move the member to be moved.

17. A redundant control system comprising:

a rigid movable member the position of which is to be controlled;

a first control channel having an output shaft that moves responsive to a command signal applied to the input of the first channel;

a second control channel having an output shaft that moves responsive to a command signal applied to the input of the second channel;

a first mechanical connection between the output shaft of the first channel and the rigid member, the first connection being non-yielding below a predetermined value of opposition to the movement of the output shaft to transmit the movement of the output shaft to the member, the first connection yielding above the predetermined value of opposition to the movement of output shaft to prevent transmission of movement of the output shaft to the member, and the predetermined value being larger than the opposition provided to the movement of the output shaft by the rigid member; and a second mechanical connection between the output shaft of the second channel and the rigid member, the second connection being non-yielding at least below the predetermined value of opposition to the movement of the output shaft, to transmit to the member the movement of the output shaft of the second channel.

18. The control system of claim 17, in which:

a transducer is provide for generating an electrical signal indicative of the extent of yielding of the first mechanical connection; and the electrical signal is combined with the command signal applied to the first channel in such a sense as to reduce the imbalance in the channels.

19. The control system of claim 18, in which the first mechanical connection comprises a precompressed spring that provides a non-yielding link between the output shaft of the first channel and the rigid member below the predetermined value and further compresses to provide a yielding link above the predetermined value, the spring being precompressed an amount corresponding to the predetermined value.

20. The control system of claim 17, in which the first mechanical connection comprises a precompressed spring that provides a non-yielding link between the output shaft of the first channel and the rigid member below the predetermined value and further compresses to provide a yielding link above the predetermined value, the spring being precompressed an amount corresponding to the predetermined value.

21. The control system of claim 17, in which the second connection yields above the predetermined value of opposition to the movement of the output shaft, to prevent transmission to the member of the movement of the output shaft of the second channel.

22. The control system of claim 21, in which:

transducers are provide for generating electrical signals indicative of the extent of yielding of the mechanical connections; and the electrical signals are combined with the respective command signals applied to the first and second channels in such a sense as to reduce the imbalance in the channels.

23. The control system of claim 22, in which the mechanical connections each comprise a precompressed spring that provides a non-yielding link between the output shaft and the rigid member below the predetermined value and further compresses to provide a yielding link therebetween above the predetermined value, the spring being precompressed an amount corresponding to the predetermined value.

References Cited

UNITED STATES PATENTS

| | | | |
|---|---|---|---|
| 2,605,615 | 8/1952 | Meredith et al. | 92—84 |
| 3,124,041 | 3/1964 | McMurtry et al. | |
| 3,160,836 | 12/1964 | Farley | 92—84 |
| 3,190,185 | 6/1965 | Rasmussen. | |
| 3,198,082 | 8/1965 | Kerris | 92—84 |

PAUL E. MASLOUSKY, *Primary Examiner.*

U.S. Cl. X.R.

91—189, 363, 438; 92—27, 84, 151; 244—77, 78

PO-1050
(5/69)

UNITED STATES PATENT OFFICE
CERTIFICATE OF CORRECTION

Patent No. 3,438,306           Dated April 15, 1969

Inventor(s) EDWARD KAZMAREK

It is certified that error appears in the above-identified patent and that said Letters Patent are hereby corrected as shown below:

IN THE SPECIFICATION:

Column 2, line 12, "output" should be --outputs--.
Column 6, line 26, "windngs" should be --windings--.
Column 8, line 9, "basicaly" should be --basically--;
         line 62, "Failured etection" should be
                  --Failure detection--.
Column 9, line 48, "so" should be --to--.

IN THE CLAIMS:

Claim 13, line 56, "yield-response" should be
                   --yield-responsive--.
Claim 18, line 5, "provide" should be --provided--.
Claim 22, line 33, "provide" should be --provided--.

SIGNED AND
SEALED
MAR 3 - 1970

(SEAL)
Attest:

Edward M. Fletcher, Jr.
Attesting Officer

WILLIAM E. SCHUYLER, JR.
Commissioner of Patents